US012657611B2

(12) United States Patent
Williams et al.

(10) Patent No.: US 12,657,611 B2
(45) Date of Patent: Jun. 16, 2026

(54) SYSTEMS AND METHODS FOR ANALYSIS OF INTERNAL DATA USING GENERATIVE AI

(71) Applicant: STATE FARM MUTUAL AUTOMOBILE INSURANCE COMPANY, Bloomington, IL (US)

(72) Inventors: Aaron Williams, Congerville, IL (US); Scott T. Christensen, Salem, OR (US); Ryan Gross, Normal, IL (US); Joseph P. Harr, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 104 days.

(21) Appl. No.: 18/196,682

(22) Filed: May 12, 2023

(65) Prior Publication Data

US 2024/0289851 A1     Aug. 29, 2024

Related U.S. Application Data

(60) Provisional application No. 63/460,673, filed on Apr. 20, 2023, provisional application No. 63/453,600, (Continued)

(51) Int. Cl.
*G06Q 30/02* (2023.01)
*G06F 16/3329* (2025.01)
(Continued)

(52) U.S. Cl.
CPC ..... *G06Q 30/0282* (2013.01); *G06F 16/3329* (2019.01); *G06Q 30/0203* (2013.01)

(58) Field of Classification Search
CPC ............ G06Q 30/0282; G06Q 30/0203; G06F 16/3329
See application file for complete search history.

(56) References Cited

U.S. PATENT DOCUMENTS 7,698,342 B1     4/2010 Evans et al.
8,095,393 B2     1/2012 Seifert et al.
(Continued)

FOREIGN PATENT DOCUMENTS

CA      3227939 A1 *  2/2023   ............. G06F 40/40
CN      112164391 A    1/2021
(Continued)

OTHER PUBLICATIONS

A. Wang N, Issa RR, Anumba CJ. Transfer learning-based query classification for intelligent building information spoken dialogue. Automation in Construction. Sep. 1, 2022;141:104403. (Year: 2022).*
(Continued)

*Primary Examiner* — Hamzeh Obaid
(74) *Attorney, Agent, or Firm* — MARSHALL, GERSTEIN & BORUN LLP

(57)            ABSTRACT

Systems and methods are described for identifying impactful elements in database information to generate a dialogue output. The method may include: (1) receiving, by one or more processors, internal database information at a generative artificial intelligence (AI) model, wherein the internal database information includes data associated with interaction dialogue; (2) analyzing, by the one or more processors, the internal database information via the generative AI model to generate an internal database analysis; (3) identifying, by the one or more processors and based upon at least the internal database analysis, one or more impact elements regarding human understanding of the internal database information via the generative AI model; and (4) generating, by the one or more processors and based upon at least the one or more impact elements, a dialogue output (or visual or virtual output) regarding the data via the generative AI model.

17 Claims, 7 Drawing Sheets

Related U.S. Application Data filed on Mar. 21, 2023, provisional application No. 63/450,222, filed on Mar. 6, 2023, provisional application No. 63/447,980, filed on Feb. 24, 2023.

(51) Int. Cl.
  *G06Q 30/0203*    (2023.01)
  *G06Q 30/0282*    (2023.01)

(56)              References Cited

U.S. PATENT DOCUMENTS

|  |  |  |
|---|---|---|
| 8,346,563 B1 | 1/2013 | Hjelm et al. |
| 9,830,748 B2 | 11/2017 | Rosenbaum |
| 9,990,782 B2 | 6/2018 | Rosenbaum |
| 10,043,217 B1 | 8/2018 | Bolden et al. |
| 10,055,793 B1 | 8/2018 | Call et al. |
| 10,181,159 B1 | 1/2019 | Allen et al. |
| 10,217,068 B1 | 2/2019 | Davis et al. |
| 10,229,394 B1 | 3/2019 | Davis et al. |
| 10,269,190 B2 | 4/2019 | Rosenbaum |
| 10,387,966 B1 | 8/2019 | Shah et al. |
| 10,467,824 B2 | 11/2019 | Rosenbaum |
| 10,482,554 B1 | 11/2019 | Vukich et al. |
| 10,497,250 B1 | 12/2019 | Hayward et al. |
| 10,535,104 B1 | 1/2020 | Mitchell et al. |
| 10,579,971 B1 | 3/2020 | Davis et al. |
| 10,635,751 B1 | 4/2020 | Relangi et al. |
| 10,679,296 B1 | 6/2020 | Devereaux et al. |
| 10,769,953 B1 | 9/2020 | Salles et al. |
| 11,038,821 B1 | 6/2021 | Harding et al. |
| 11,087,404 B1 | 8/2021 | Devereaux et al. |
| 11,127,081 B1 | 9/2021 | Kullman et al. |
| 11,227,452 B2 | 1/2022 | Rosenbaum |
| 11,238,506 B1 | 2/2022 | Tomlinson et al. |
| 11,250,515 B1 | 2/2022 | Feiteira et al. |
| 11,407,410 B2 | 8/2022 | Rosenbaum |
| 11,438,283 B1 | 9/2022 | White et al. |
| 11,518,391 B1 | 12/2022 | Sanchez |
| 11,524,707 B2 | 12/2022 | Rosenbaum |
| 11,544,807 B1 | 1/2023 | Breitweiser et al. |
| 11,594,083 B1 | 2/2023 | Rosenbaum |
| 11,669,907 B1 | 6/2023 | Behrens et al. |
| 11,693,726 B2 | 7/2023 | Lozano et al. |
| 11,720,903 B1 | 8/2023 | Henryson et al. |
| 11,757,807 B2 | 9/2023 | Bhardwaj et al. |
| 11,783,421 B2 | 10/2023 | Huls |
| 11,790,296 B1 | 10/2023 | Henryson et al. |
| 11,818,111 B1 | 11/2023 | Debolt |
| 11,836,805 B1 | 12/2023 | Culbertson et al. |
| 11,837,004 B1 | 12/2023 | Agrahari et al. |
| 11,922,515 B1 | 3/2024 | Lombard et al. |
| 12,087,152 B1 | 9/2024 | Buentello et al. |
| 12,217,606 B1 | 2/2025 | Cheng et al. |
| 12,236,377 B2 | 2/2025 | Sohum et al. |
| 2001/0027403 A1 | 10/2001 | Peterson et al. |
| 2001/0037265 A1 | 11/2001 | Kleinberg |
| 2002/0002475 A1 | 1/2002 | Freedman et al. |
| 2002/0112011 A1 | 8/2002 | Washington |
| 2003/0028448 A1 | 2/2003 | Joseph et al. |
| 2006/0212566 A1 | 9/2006 | Boujard et al. |
| 2008/0056473 A1 | 3/2008 | Kent et al. |
| 2009/0125320 A1 | 5/2009 | Bickett |
| 2009/0240531 A1 | 9/2009 | Hilborn |
| 2009/0287509 A1 | 11/2009 | Basak et al. |
| 2010/0145734 A1 | 6/2010 | Becerra et al. |
| 2011/0119574 A1 | 5/2011 | Rogers et al. |
| 2011/0295623 A1 | 12/2011 | Behringer et al. |
| 2011/0313794 A1 | 12/2011 | Feeney |
| 2012/0101852 A1 | 4/2012 | Albert |
| 2012/0124485 A1 | 5/2012 | Scherpa et al. |
| 2012/0143634 A1 | 6/2012 | Beyda et al. |
| 2012/0303390 A1 | 11/2012 | Brook et al. |
| 2013/0204619 A1 | 8/2013 | Berman et al. |
| 2013/0218603 A1 | 8/2013 | Hagelstein et al. |
| 2013/0226624 A1 | 8/2013 | Blessman et al. |
| 2014/0094991 A1 | 4/2014 | Bouillet et al. |
| 2014/0100892 A1 | 4/2014 | Collopy et al. |
| 2014/0222469 A1 | 8/2014 | Stahl et al. |
| 2014/0358731 A1 | 12/2014 | Itte et al. |
| 2014/0379385 A1 | 12/2014 | Duncan et al. |
| 2015/0170288 A1 | 6/2015 | Harton et al. |
| 2015/0213556 A1 | 7/2015 | Haller, Jr. |
| 2015/0339759 A1 | 11/2015 | Pope et al. |
| 2016/0041069 A1 | 2/2016 | Huang et al. |
| 2016/0071217 A1 | 3/2016 | Edwards et al. |
| 2016/0086231 A1 | 3/2016 | Darey |
| 2016/0238397 A1 | 8/2016 | Caira et al. |
| 2016/0273181 A1 | 9/2016 | Smith |
| 2017/0004508 A1 | 1/2017 | Mansfield et al. |
| 2017/0060694 A1 | 3/2017 | Makhov et al. |
| 2017/0103346 A1 | 4/2017 | Bodell et al. |
| 2017/0132643 A1 | 5/2017 | Sagade et al. |
| 2017/0132666 A1 | 5/2017 | Slavin |
| 2017/0191848 A1 | 7/2017 | Jones |
| 2018/0047288 A1 | 2/2018 | Cordell et al. |
| 2018/0075538 A1 | 3/2018 | Konrardy et al. |
| 2018/0082683 A1 | 3/2018 | Chen et al. |
| 2018/0173999 A1 | 6/2018 | Renard |
| 2018/0293483 A1 | 10/2018 | Abramson et al. |
| 2018/0293660 A1 | 10/2018 | Rakshe et al. |
| 2018/0334176 A1 | 11/2018 | Park |
| 2019/0037077 A1* | 1/2019 | Konig ................. H04M 3/5183 |
| 2019/0095822 A1 | 3/2019 | Rugel et al. |
| 2019/0114715 A1 | 4/2019 | Hessinger et al. |
| 2019/0122121 A1 | 4/2019 | Yu |
| 2019/0306327 A1 | 10/2019 | Matysiak et al. |
| 2019/0332661 A1 | 10/2019 | Halprin et al. |
| 2019/0391827 A1 | 12/2019 | Simanovich et al. |
| 2020/0019893 A1 | 1/2020 | Lu |
| 2020/0042649 A1 | 2/2020 | Bakis et al. |
| 2020/0104876 A1 | 4/2020 | Chintakindi et al. |
| 2020/0143481 A1 | 5/2020 | Brown et al. |
| 2020/0154170 A1 | 5/2020 | Wu et al. |
| 2020/0167134 A1 | 5/2020 | Dey et al. |
| 2020/0210490 A1 | 7/2020 | Hutchins |
| 2020/0274962 A1 | 8/2020 | Martin et al. |
| 2020/0285225 A1 | 9/2020 | Lankehanumaiah et al. |
| 2020/0339160 A1 | 10/2020 | Rosenbaum |
| 2021/0064932 A1 | 3/2021 | Wang et al. |
| 2021/0073330 A1 | 3/2021 | Inagaki et al. |
| 2021/0117923 A1 | 4/2021 | Gray et al. |
| 2021/0152496 A1 | 5/2021 | Kim et al. |
| 2021/0200950 A1 | 7/2021 | Basu et al. |
| 2021/0203784 A1 | 7/2021 | Konig et al. |
| 2021/0256616 A1 | 8/2021 | Hayward et al. |
| 2021/0271820 A1* | 9/2021 | Raghupatruni ....... G06F 40/237 |
| 2021/0273892 A1 | 9/2021 | Rakshit |
| 2021/0295203 A1 | 9/2021 | Liao et al. |
| 2021/0350357 A1 | 11/2021 | Lafontaine |
| 2021/0357771 A1 | 11/2021 | Flowers et al. |
| 2021/0357790 A1 | 11/2021 | Volkov et al. |
| 2021/0365955 A1 | 11/2021 | Galante et al. |
| 2021/0366048 A1 | 11/2021 | Westhues et al. |
| 2021/0374092 A1 | 12/2021 | Sahay |
| 2021/0383494 A1 | 12/2021 | Leise et al. |
| 2021/0390950 A1 | 12/2021 | Kumar et al. |
| 2021/0406938 A1 | 12/2021 | Thakral |
| 2022/0004630 A1 | 1/2022 | Almukaynizi et al. |
| 2022/0019496 A1 | 1/2022 | Lozano et al. |
| 2022/0091957 A1 | 3/2022 | Szczepanik et al. |
| 2022/0092893 A1 | 3/2022 | Rosenbaum |
| 2022/0094789 A1 | 3/2022 | Lau et al. |
| 2022/0114594 A1 | 4/2022 | Nunes et al. |
| 2022/0136847 A1 | 5/2022 | Higuchi et al. |
| 2022/0176971 A1 | 6/2022 | Nordh |
| 2022/0198531 A1* | 6/2022 | Cleaver .................... G06F 8/10 |
| 2022/0207413 A1 | 6/2022 | Harsha et al. |
| 2022/0261535 A1 | 8/2022 | Madaan et al. |
| 2022/0269583 A1 | 8/2022 | Plawecki |
| 2022/0279014 A1 | 9/2022 | Stokes et al. |
| 2022/0293107 A1* | 9/2022 | Leaman ................. G06N 20/00 |
| 2022/0300993 A1* | 9/2022 | Chaudhry ............... H04L 51/10 |
| 2022/0308943 A1 | 9/2022 | Srinivasan et al. |
| 2022/0340148 A1 | 10/2022 | Rosenbaum |

(56) References Cited

U.S. PATENT DOCUMENTS

| | | | |
|---|---|---|---|
| 2022/0366459 A1 | 11/2022 | Vieyra | |
| 2023/0005070 A1 | 1/2023 | Nguyen et al. | |
| 2023/0017739 A1 | 1/2023 | Feldman et al. | |
| 2023/0023869 A1 | 1/2023 | Ganesan et al. | |
| 2023/0060300 A1 | 3/2023 | Rosenbaum | |
| 2023/0064816 A1* | 3/2023 | Matsuoka | H04L 51/216 |
| 2023/0105564 A1 | 4/2023 | Breitweiser et al. | |
| 2023/0108454 A1 | 4/2023 | Gidwaney et al. | |
| 2023/0110941 A1 | 4/2023 | Makhija et al. | |
| 2023/0116639 A1 | 4/2023 | Patt et al. | |
| 2023/0140931 A1 | 5/2023 | Anderson et al. | |
| 2023/0141853 A1* | 5/2023 | Vu | G06F 16/3329 704/2 |
| 2023/0244938 A1 | 8/2023 | Wei et al. | |
| 2023/0259821 A1 | 8/2023 | Travalini et al. | |
| 2023/0267512 A1 | 8/2023 | Isackson et al. | |
| 2023/0267694 A1 | 8/2023 | Breitweiser et al. | |
| 2023/0290502 A1 | 9/2023 | Zhi et al. | |
| 2023/0298567 A1 | 9/2023 | Tan et al. | |
| 2023/0316412 A1 | 10/2023 | Behrens et al. | |
| 2023/0343149 A1 | 10/2023 | Volos et al. | |
| 2023/0385939 A1 | 11/2023 | Tsuchiyma et al. | |
| 2023/0410801 A1* | 12/2023 | Mishra | H04L 51/02 |
| 2024/0073219 A1 | 2/2024 | Maizels et al. | |
| 2024/0102814 A1 | 3/2024 | Karri et al. | |
| 2024/0111960 A1 | 4/2024 | Earle et al. | |
| 2024/0119424 A1 | 4/2024 | Lofvers et al. | |
| 2024/0167864 A1 | 5/2024 | Donovan et al. | |
| 2024/0168611 A1* | 5/2024 | Pham | G06F 18/23213 |
| 2024/0248920 A1* | 7/2024 | Qiao | G06F 16/3329 |
| 2024/0249557 A1 | 7/2024 | Chavali | |
| 2024/0256780 A1 | 8/2024 | Douglas et al. | |
| 2024/0371367 A1 | 11/2024 | Churgin et al. | |
| 2024/0371376 A1 | 11/2024 | Bohl et al. | |
| 2025/0013555 A1 | 1/2025 | Papadopoulos et al. | |

FOREIGN PATENT DOCUMENTS

| | | |
|---|---|---|
| EP | 2946168 A1 | 11/2015 |
| EP | 3239686 A1 | 11/2017 |
| EP | 3578433 B1 | 8/2020 |
| EP | 3730375 B1 | 10/2021 |
| EP | 3960576 A1 | 3/2022 |
| EP | 4190659 A1 | 6/2023 |
| EP | 4190660 A1 | 6/2023 |
| IN | 201741025968 | 12/2017 |
| KR | 10-2148616 B1 | 8/2020 |
| WO | 2013/059620 A2 | 4/2013 |
| WO | 2014/111537 A1 | 7/2014 |
| WO | 2020/139697 A1 | 7/2020 |
| WO | 2023/021162 A2 | 2/2023 |

OTHER PUBLICATIONS

STIC EIC Search Report for U.S. Appl. No. 18/196,691 (Year: 2024).

Anonymous, Roots Automation Introduces InsurGPT—the World's Most Advanced Generative AI Model for Insurance. Retrieved from the Internet at: https://ffnews.com/newsarticle/roots-automation-introduces-insurgpt-the-worlds-most-advanced-generative-ai-model-for-insurance/ (published May 15, 2023).

Introducing Agent M—a powerful Large Language model or ChatGPT based Master Agent developer framework, powered by Floatbot platform, that lets you create multiple application-specific LLM-based Agent(s). Retrieved from the internet at: <URL:https://www.linkedin.com/posts/jimmypadia_nyse-floor-talk-floatbot-activity-7089664064603234304-60TU?utm_source=share&utm_medium=member_android> (2023).

Isenberg, The Compliance Tasks ChatGPT Can (and Can't) Handle, Ignites (published Apr. 3, 2023).

Morelli, Will ChatGPT, artificial intelligence replace financial professionals any time soon?, Insurance NewsNet. Retrieved from the Internet at: <https://insurancenewsnet.com/innarticle/will-chatgpt-artificial-intelligence-replace-financial-professionals-any-time-soon> (published Jan. 23, 2023).

Morris, Morgan Stanley Developing Chatbot with OpenAI, Ignites (published Mar. 15, 2023).

Munk, Will AI models like ChatGPT take your insurance job?, Life Annuity Speciality (published Mar. 7, 2023).

Rengachary et al., ChatGPT: A Conversation About Underwriting and Life Insurance. Retrieved from the internet at: https://www.coverager.com/chatgpt-a-conversation-about-underwriting-and-life-insurance/ (published Apr. 3, 2023).

Smith, Insurer Zurich experiments with ChatGPT for claims and data mining, Financial Times (published Mar. 24, 2023).

Tuohy, What ChatGPT's Chores May Look Like in Life Insurance Industry, Life Annuity Specialist (published Apr. 21, 2023).

Wilson, Should Financial Services Companies Consider Open AI?, LIMRA.com MarketFacts (published Mar. 2023).

Dickson, How to create a private ChatGPT that interacts with your local documents, TechTalks. Retrieved from the Internet at: <URL:https://bdtechtalks.com/2023/06/01/create-privategpt-local-llm/> (Jun. 2023).

OpenPR Worldwide Public Relations, Press release, "Floatbot.AI Unveils Revolutionary Agent M—Generative AI (LLM or ChatGPT) Based Master Agent developer framework," Web page downloaded from Internet at <https://www.openpr.com/news/3147235/floatbot-ai-unveils-revolutionary-aqent-m-generative-ai-llm>. Retrieved from Internet on Aug. 1, 2023.

The Future of Car Insurance #2: How AI Is Transforming Auto Insurance for Companies and Drivers, Brogan Woodburn, Rashawn Mitchner, dated Jun. 22, 2023. (Year: 2023).

"Encrypt Team," "ChatGPT—AI Chat bot—A Complete Guide," www.theencrypt.com 2022 (Year: 2022).

Jadhav et al., "Design and Development of Chatbot Based on Reinforcement Learning," Chapter 12, https://doi.org/10.1002/9781119861850.ch12 2022 (Year: 2022).

Mleczko, K. (2021). Chatbot as a tool for knowledge sharing in the maintenance and repair processes. Multidisciplinary Aspects of Production Engineering, 4(1), 499-508. (Year: 2021).

U.S. Appl. No. 18/462,032 ip.com NPL Search History, Report Run Date: Jun. 14, 2025.

Hossen et al., Controlling home appliances adopting chatbot using machine learning approach. In International Conference on Intelligent Computing & Optimization, pp. 253-264, Springer International Publishing (Oct. 2022).

Sankaranarayanan et al., Flood prediction based on weather parameters using deep learning, Journal of Water and Climate Change, 2020 (Year: 2020).

Zhang et al., DIALOGPT : Large-Scale Generative Pre-training for Conversational Response Generation, A collaboration between Microsoft Research and Microsoft Dynamics 365 AI Research, pp. 270-278, Jul. 5- Jul. 10, 2020.

Dhieb et al., "A Secure AI-Driven Architecture for Automated Insurance Systems: Fraud Detection and Risk Measurement," IEEE Access, 2020 (Year: 2020).

Doultani et al., "Smart Underwriting—A Personalized Virtual Agent," Fifth International Conference on Intelligent Computing and Control Systems, 2021 (Year: 2021).

Jacques et al., "Human-centric dialog training via offline reinforcement learning," arXiv:2010.05848v1 [cs.CL] 2020 (Year: 2020).

* cited by examiner

200A

200B

300

400A

400B

500 ⬎

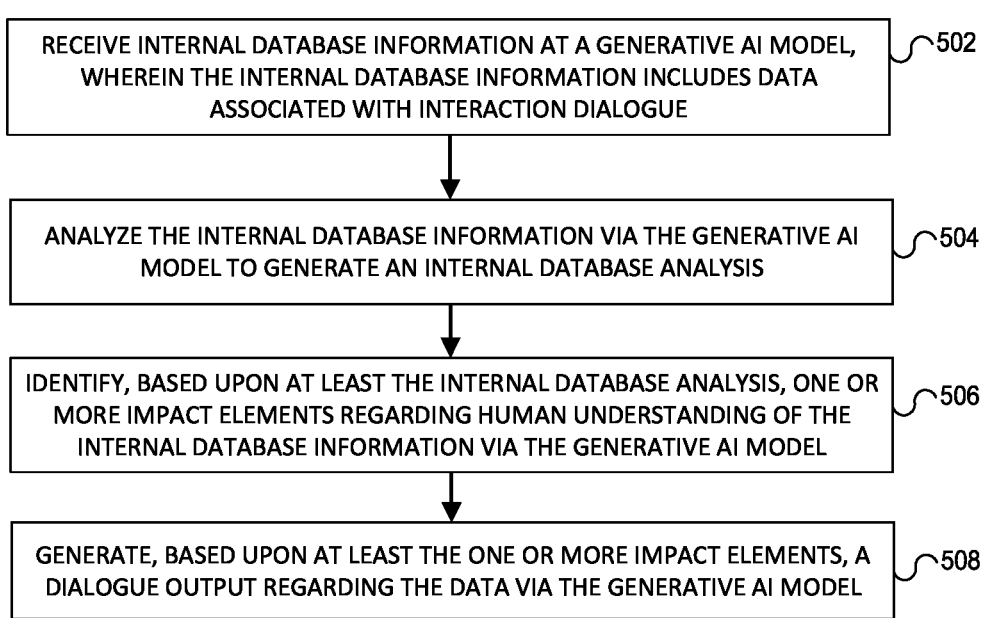

RECEIVE INTERNAL DATABASE INFORMATION AT A GENERATIVE AI MODEL, WHEREIN THE INTERNAL DATABASE INFORMATION INCLUDES DATA ASSOCIATED WITH INTERACTION DIALOGUE — 502

ANALYZE THE INTERNAL DATABASE INFORMATION VIA THE GENERATIVE AI MODEL TO GENERATE AN INTERNAL DATABASE ANALYSIS — 504

IDENTIFY, BASED UPON AT LEAST THE INTERNAL DATABASE ANALYSIS, ONE OR MORE IMPACT ELEMENTS REGARDING HUMAN UNDERSTANDING OF THE INTERNAL DATABASE INFORMATION VIA THE GENERATIVE AI MODEL — 506

GENERATE, BASED UPON AT LEAST THE ONE OR MORE IMPACT ELEMENTS, A DIALOGUE OUTPUT REGARDING THE DATA VIA THE GENERATIVE AI MODEL — 508

Figure 5

SYSTEMS AND METHODS FOR ANALYSIS OF INTERNAL DATA USING GENERATIVE AI

CROSS-REFERENCE TO RELATED APPLICATIONS

This application claims priority to and the benefit of the filing date of provisional U.S. Patent Application No. 63/447,980 entitled "SYSTEMS AND METHODS FOR ANALYSIS OF INTERNAL DATA USING GENERATIVE AI," filed on Feb. 24, 2023; provisional U.S. Patent Application No. 63/450,222 entitled "SYSTEMS AND METHODS FOR ANALYSIS OF INTERNAL DATA USING GENERATIVE AI," filed on Mar. 6, 2023; provisional U.S. Patent Application No. 63/453,600 entitled "SYSTEMS AND METHODS FOR ANALYSIS OF INTERNAL DATA USING GENERATIVE AI," filed on Mar. 21, 2023; and provisional U.S. Patent Application No. 63/460,673 entitled "SYSTEMS AND METHODS FOR ANALYSIS OF INTERNAL DATA USING GENERATIVE AI," filed on Apr. 20, 2023. The entire contents of the provisional applications are hereby expressly incorporated herein by reference.

FIELD OF THE DISCLOSURE

Systems and methods are disclosed for using internal database data, identifying potentially impactful factors based upon at least the internal database data, and generating an output dialogue.

BACKGROUND

Current systems for analyzing and accessing data may be cumbersome and/or difficult to understand for a user. For example, when generating a product using internal data, a system may simply generate the product without providing guidance to a user as to how the system reached the endpoint, which may cause difficulties in further modification without harming the overall product. Alternatively, the system may direct a user to a human element to answer questions, which may cause additional difficulties based upon timing, miscommunication, misunderstanding, etc.

In addition, current systems for generating, developing, and presenting data to a user may not account for nuances in language and user interpretation. For example, current systems may generate public-facing data, such as surveys for individuals to take, based upon past feedback, but may not properly parse the feedback in question. For instance, when generating a survey based upon past feedback, a current system may rely more on numerical feedback or particular keywords rather than on the totality of the dialogue.

The systems and methods disclosed herein provide solutions to these problems and may provide solutions to the ineffectiveness, insecurities, difficulties, inefficiencies, encumbrances, and/or other drawbacks of conventional techniques.

SUMMARY

The present embodiments may relate to, inter alia, accurately and efficiently identifying impact factors in internal data and generating output dialogue associated with such. Systems and methods that may generate work product based upon the impact factors in the internal data are also provided.

In one aspect, a computer-implemented method for identifying impactful elements in database information to generate a dialogue output may be provided. The method may be implemented via one or more local or remote processors, servers, sensors, transceivers, memory units, mobile devices, wearables, smart glasses, augmented reality glasses, virtual reality glasses, smart contacts, mixed or extended reality glasses or headsets, voice bots, chatbots, generative pretrained transformer bots (e.g., ChatGPT® bots or ChatGPT®-related bots), and/or other electronic or electrical components. For example, in one instance, the method may include: (1) receiving, by one or more processors, internal database information at a generative artificial intelligence (AI) model, wherein the internal database information includes data associated with interaction dialogue; (2) analyzing, by the one or more processors, the internal database information via the generative AI model to generate an internal database analysis; (3) identifying, by the one or more processors and based upon at least the internal database analysis, one or more impact elements regarding human understanding of the internal database information via the generative AI model; and/or (4) generating, by the one or more processors and based upon at least the one or more impact elements, a dialogue output (or visual or virtual output) regarding the data via the generative AI model. The method may include additional, less, or alternate actions and functionality, including that discussed elsewhere herein.

For instance, the internal database information may include at least one of: (i) customer feedback information, (ii) market feedback information, (iii) project information, and/or (iv) internal inventory information. The internal database information may include the customer feedback information and identifying the one or more impact elements may include: determining, by the one or more processors and based upon at least the internal database analysis, one or more concepts central to one or more questions of a survey associated with the customer feedback information; identifying, by the one or more processors, one or more words or phrases associated with the one or more concepts; and determining, by the one or more processors, an impact of the one or more words or phrases on the human understanding of the internal database information.

Further, the generating the dialogue output may include: (i) determining, by the one or more processors, an impact of one or more alternative words or phrases on the human understanding of the internal database information, wherein the one or more alternative words or phrases are associated with the one or more concepts; and/or (ii) generating, by the one or more processors, one or more alternate questions for the survey associated with the customer feedback information based upon at least the one or more alternative words or phrases.

The internal database information may include the market feedback information and analyzing the internal database information may include: determining, by the one or more processors, one or more concepts of the market feedback information via the generative AI model; and wherein identifying the one or more impact elements may include: identifying, by the one or more processors, one or more positive words or phrases associated with the market feedback using the generative AI model.

Further, the dialogue output may include at least one of: (i) a product pitch, (ii) a service pitch, or (iii) a public relations campaign associated with the data. Additionally, the one or more impact elements may include an impact of the data on at least one of: (i) public relations, (ii) good will associated with a project, (iii) regulatory ramifications, (iv) potential legal ramifications, or (v) governmental oversight of the project.

Moreover, the generative AI model includes at least one of: (i) an AI or machine learning (ML) chatbot or (ii) an AI or ML voice bot.

In another aspect, a computer system for identifying impactful elements in database information to generate a dialogue output may be provided. The computer system may include one or more local or remote processors, servers, sensors, transceivers, memory units, mobile devices, wearables, smart glasses, augmented reality glasses, virtual reality glasses, smart contacts, mixed or extended reality glasses or headsets, voice bots, chatbots, generative pretrained transformer bots (e.g., ChatGPT® bots or ChatGPT®-related bots), and/or other electronic or electrical components. For example, in one instance, the computer system may include one or more processors; a communication unit; and a non-transitory computer-readable medium coupled to the one or more processors and the communication unit and storing instructions thereon that, when executed by the one or more processors, cause the computing device to: (1) receive internal database information at a generative artificial intelligence (AI) model, wherein the internal database information includes data associated with interaction dialogue; (2) analyze the internal database information via the generative AI model to generate an internal database analysis; (3) identify, based upon at least the internal database analysis, one or more impact elements regarding human understanding of the internal database information via the generative AI model; and/or (4) generate, based upon at least the one or more impact elements, a dialogue output (or visual or virtual output) regarding the data via the generative AI model. The computing device may include additional, less, or alternate functionality, including that discussed elsewhere herein.

In another aspect, a tangible, non-transitory computer-readable medium storing instructions for identifying impactful elements in database information to generate a dialogue output may be provided. The non-transitory computer-readable medium stores instructions that, when executed by one or more processors of a computing device, cause the computing device to: (1) receive internal database information at a generative artificial intelligence (AI) model, wherein the internal database information includes data associated with interaction dialogue; (2) analyze the internal database information via the generative AI model to generate an internal database analysis; (3) identify, based upon at least the internal database analysis, one or more impact elements regarding human understanding of the internal database information via the generative AI model; and/or (4) generate, based upon at least the one or more impact elements, a dialogue output (or visual or virtual output) regarding the data via the generative AI model. The computer-readable instructions may include instructions that provide additional, less, or alternate functionality, including that discussed elsewhere herein.

In another aspect, a computer-implemented method for identifying impactful elements in database information to generate a dialogue output may be provided. The method may be implemented via one or more local or remote processors, servers, sensors, transceivers, memory units, mobile devices, wearables, smart glasses, augmented reality glasses, virtual reality glasses, smart contacts, mixed or extended reality glasses or headsets, voice bots, chatbots, generative pretrained transformer bots (e.g., ChatGPT® bots or ChatGPT®-related bots), and/or other electronic or electrical components. For example, in one instance, the method may include: (1) receiving, by one or more processors, internal database information at a machine learning (ML) model, wherein the internal database information includes data associated with interaction dialogue; (2) analyzing, by the one or more processors, the internal database information via the ML model to generate an internal database analysis; (3) identifying, by the one or more processors and based upon at least the internal database analysis, one or more impact elements regarding human understanding of the internal database information via the ML model; and/or (4) generating, by the one or more processors and based upon at least the one or more impact elements, a dialogue output (or visual output) regarding the data via the ML model. The method may include additional, less, or alternate actions and functionality, including that discussed elsewhere herein.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

FIG. 5 depicts a flow diagram representing an exemplary computer-implemented method for using a generative artificial intelligence and/or machine learning model to analyze internal database information.

Figure 1:
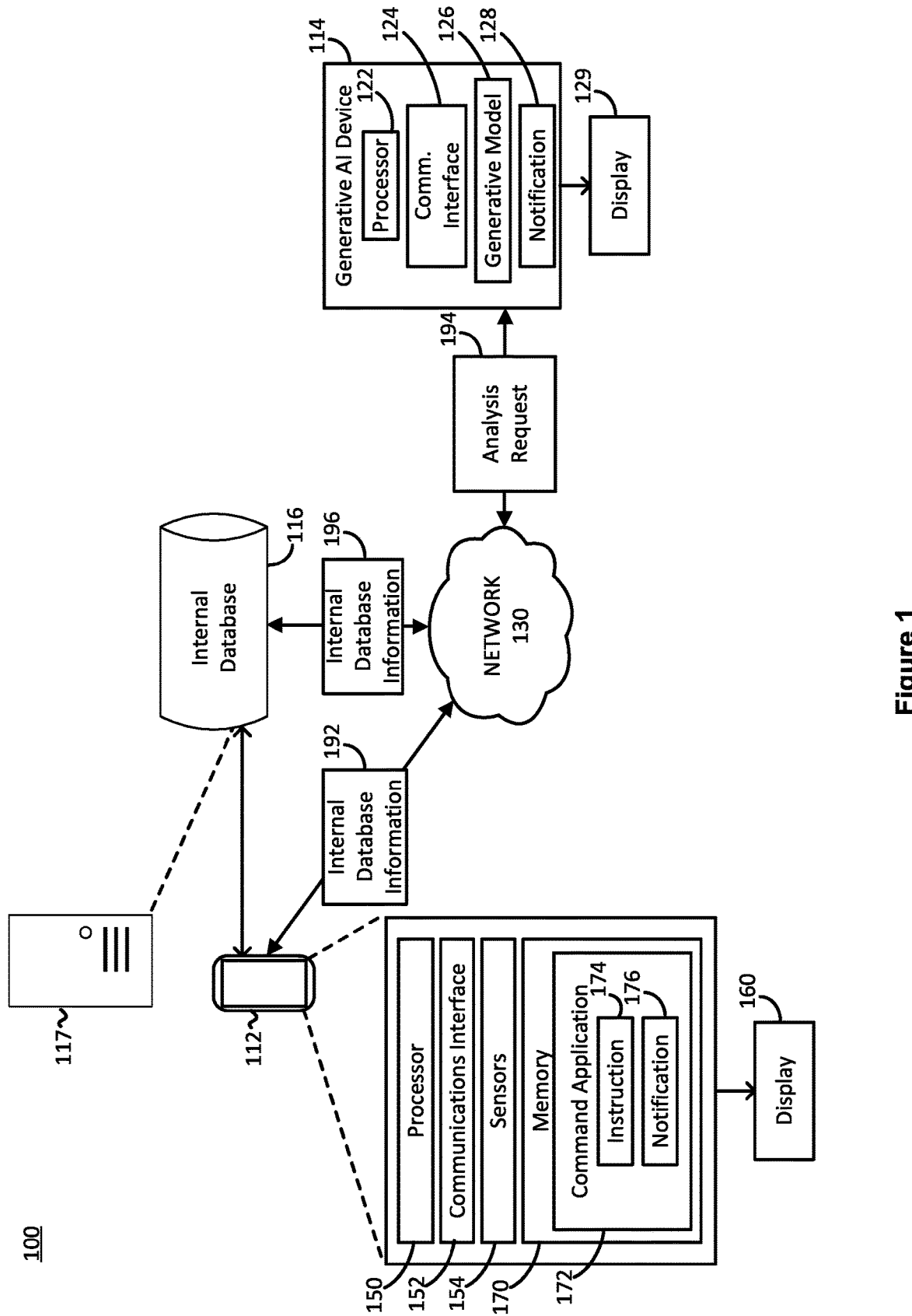
FIG. 1 depicts an exemplary computer system that facilitates communication, data gathering, and analysis via a generative device implementing a generative artificial intelligence and/or machine learning model.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Techniques, systems, apparatuses, components, devices, and methods are disclosed for, inter alia, analyzing data (e.g., internal database information/data) using a generative artificial intelligence (AI) and/or machine learning (ML) model. For example, a system may receive internal database information associated with customer feedback information, market feedback information, project information, internal inventor information, etc.

A generative AI may be used to analyze internal company data to identify potentially impactful factors. In particular customer feedback and feedback survey information may be input into the generative AI to reduce the overall number of questions, improve the understandability of language used, generate context for a responder, etc. Further, the AI may receive market feedback and determine new products, services, PR campaigns, etc. for human teams to focus on. Similarly, the generative AI may receive training measures and identify ineffective training measures (e.g., training measures that don't make sense to a user) or generate effective training measures and/or programs of related ideas. Moreover, the generative AI may similarly determine the impact of a project on business, such as how customer perspective may be affected; what regulatory, legal, or governmental issues may arise; or how a project may impact public relations, good will, or other factors such as climate. In further embodiments, the AI may automate ordering inventory or finding resources by tracking internal routines and inventory.

In some embodiments, the generative artificial intelligence (AI) models (also referred to as generative machine learning (ML) models) including voice bots or chatbots discussed herein may be configured to utilize artificial intelligence and/or machine learning techniques. For instance, the voice or chatbot may be a generative pretrained transformer chatbot (e.g., ChatGPT® chatbot). The voice or chatbot may employ supervised or unsupervised machine learning techniques, which may be followed or used in conjunction with reinforced or reinforcement learning techniques. The voice or chatbot may employ the techniques utilized for ChatGPT®. The voice bot, chatbot, ChatGPT®-based bot, ChatGPT® bot, and/or other bots may generate audible or verbal output, text or textual output, visual or graphical output, output for use with speakers and/or display screens, and/or other types of output for user and/or other computer or bot consumption.

Noted above, in some embodiments, a chatbot or other computing device may be configured to implement machine learning, such that server computing device "learns" to analyze, organize, and/or process data without being explicitly programmed. Machine learning may be implemented through machine learning ("ML") methods and algorithms ("ML methods and algorithms"). In one exemplary embodiment, a machine learning module ("ML module") may be configured to implement ML methods and algorithms.

As used herein, a chat or voice bot (referred to broadly as "chatbot") may refer to a specialized system for implementing, training, utilizing, and/or otherwise providing an AI or ML model to a user for dialogue interaction (e.g., "chatting"). Depending on the embodiment, the chatbot may utilize and/or be trained according to language models, such as natural language processing (NLP) models and/or large language models (LLMs). Similarly, the chatbot may utilize and/or be trained according to generative adversarial network techniques, as described in more detail below with regard to FIGS. 2A and 2B.

The chatbot may receive inputs from a user via text input, spoken input, gesture input, etc. The chatbot may then use AI and/or ML techniques as described herein to process and analyze the input before determining an output and display-ing the output to the user. Depending on the embodiment, the output may be in a same or different form than the input (e.g., spoken, text, gestures, etc.), may include images, and/or may otherwise communicate the output to the user in an overarching dialogue format.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiment, a processing element may be trained by providing it with a large sample of data with known characteristics or features.

In another embodiment, a ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs, as described in more detail below with regard to FIGS. 2A and 2B. Other types of machine learning may also be employed, including deep or combined learning techniques.

Exemplary Computer System for Detecting, Predicting, and/or Responding to Malfunctions in a Heating System FIG. 1 depicts an exemplary computer system 100 for analyzing internal entity data to identify potentially impactful factors, in accordance with various aspects of the present disclosure. An entity, such as a user or an insurance company, may wish to use a generative AI or ML model to determine how an individual will react to information, a project, a product, a PR (public relations) campaign, etc.

The internal data may include data associated with a user, such as user data, or a property, such as home telematics data. The user data (e.g., user telematics data) may include data from the user's mobile device, or other computing devices, such as smart glasses, wearables, smart watches, laptops, smart glasses, augmented reality glasses, virtual reality headsets, etc. The user data or user telematics data may include data associated with the movement of the user, such as GPS or other location data, and/or other sensor data, including camera data or images acquired via the mobile or other computing device. In some embodiments, the user data and/or user telematics data may include historical data related to the user, such as historical home data, historical claim data, historical accident data, etc. In further embodiments, the user data and/or user telematics data may include present and/or future data, such as expected occupancy data, projected claim data, projected accident data, etc. Depending on the embodiment, the historical user data and the present and/or future data may be related.

The user data or user telematics data may also include home telematics data collected or otherwise generated by a home telematics app installed and/or running on the user's mobile device or other computing device. For instance, a home telematics app may be in communication with a smart home controller (e.g., for controlling a heating/HVAC system) and/or smart lights, smart appliances, or other smart devices situated about a home, and may collect data from the interconnected smart devices and/or smart home sensors. Depending on the embodiment, the user telematics data and/or the home telematics data may include information input by the user at a computing device or at another device associated with the user. In further embodiments, the user telematics data and/or the home telematics data may only be collected or otherwise generated after receiving a confirmation from the user, although the user may not directly input the data. Additionally or alternatively, the user data and/or home telematics data may include electric device usage data, electricity usage data, water usage date, electric meter data, water meter data, etc.

Mobile device 112 may be associated with (e.g., in the possession of, configured to provide secure access to, etc.) a particular user, who may provide a response to an inquiry (e.g., a survey) to a database, such as internal database 116. Mobile device 112 may be a personal computing device of that user, such as a mobile device, smartphone, a tablet, smart contacts, smart glasses, smart headset (e.g., augmented reality, virtual reality, or extended reality headset or glasses), smart watch, wearable, or any other suitable device or combination of devices (e.g., a smart watch plus a smartphone) with wireless communication capability. In the embodiment of FIG. 1, mobile device 112 may include a processor 150, a communications interface 152, sensors 154, a memory 170, and a display 160.

Processor 150 may include any suitable number of processors and/or processor types. Processor 150 may include one or more CPUs and one or more graphics processing units (GPUs), for example. Generally, processor 150 may be configured to execute software instructions stored in memory 170. Memory 170 may include one or more persistent memories (e.g., a hard drive and/or solid-state memory) and may store one or more applications, including command application 172.

The mobile device 112 may be communicatively coupled to a computing device 117 associated with the internal database 116. For example, the mobile device 112 and computing device 117 associated with the internal database 116 may communicate via USB, Bluetooth, Wi-Fi Direct, Near Field Communication (NFC), etc. In other embodiments, mobile device 112 may obtain data from the internal database 116 from sensors 154 within the mobile device 112.

Further still, mobile device 112 may obtain the internal entity data via a user interaction with a display 160 of the mobile device 112. For example, a user may respond via the display 160 to a survey or interact with the generative device 114 via the display 160. The mobile device 112 may then generate a communication that may include the internal entity data.

Depending on the embodiment, a computing device 117 associated with the internal database 116 may obtain internal entity data for the internal database 116 indicative of user responses, survey information, and/or other interaction data. In other embodiments, the computing device 117 associated with the internal database 116 may obtain internal entity data through interfacing with a mobile device 112.

In some embodiments, the internal entity data may include interpretations of raw data, such as analysis of survey data. Also, in some embodiments, computing device 117 associated with the internal database 116 and/or mobile device 112 may generate and transmit communications periodically (e.g., every minute, every hour, every day), where each communication may include a different set of internal entity data collected over a most recent time period. In other embodiments, computing device 117 associated with the internal database 116 and/or mobile device 112 may generate and transmit communications as the mobile device 112 and/or computing device 117 associated with the internal database 116 receive new internal entity data.

In some embodiments, generating the communication 196 may include (i) obtaining identity data for the computing device 117 and/or the internal database 116; (ii) obtaining identity data for the mobile device 112 in the internal database 116; and/or (iii) augmenting the communication 196 with the identity data for the internal database 116, the computing device 117, and/or the mobile device 112. The communication 196 may include the internal entity data.

In further embodiments, a generative device 114 may receive and/or transmit data related to an analysis request 194 via the network 130. Depending on the embodiment, the generative device may include one or more processors 122, a communications interface 124, a generative model module 126, a notification module 128, and a display 129. In some embodiments, each of the one or more processors 122, communications interface 124, generative model module 126, notification module 128, and display 129 may be similar to the components described above with regard to the mobile device 112.

The mobile device 112 and the computing device 117 associated with the internal database 116 may be associated with the same user. Mobile device 112, and optionally the computing device 117 associated with the internal database 116, may be communicatively coupled to generative device 114 via a network 130. Network 130 may be a single communication network or may include multiple communication networks of one or more types (e.g., one or more wired and/or wireless local area networks (LANs), and/or one or more wired and/or wireless wide area networks (WANs) such as the internet). In some embodiments, the generative device 114 may connect to the network 130 via a communications interface 124 much like mobile device 112.

While FIG. 1 shows only one mobile device 112, it is understood that many different mobile devices (of different users), each similar to mobile device 112, may be in remote communication with network 130. Additionally, while FIG.

1 shows only one internal database 116 and associated computing device 117, it is understood that many servers and/or databases, each similar to internal database 116, may include computing devices 117 that are in remote communication with network 130.

Further, while FIG. 1 shows only one generative device 114, it is understood that many different generative devices, each similar to generative device 114, may be in remote communication with network 130. Generative device 114 and/or any other similar generative device may be associated with an insurance company, a regulator organization, a property rental company, and/or a similar organization.

Exemplary Machine Learning

Optionally, the system 100 may determine particular data using a machine learning (and/or artificial intelligence) model for data evaluation. The machine learning model may be trained based upon a plurality of sets of internal entity data, and corresponding determinations. The machine learning model may use the internal entity data to generate the determinations as described herein. In some embodiments, the machine learning model may be or include a generative AI or ML model as described with regard to FIGS. 2A and 2B. In further embodiments, the machine learning model may perform some determinations as described herein while others are performed by a generative AI or ML model as described with regard to FIGS. 2A and 2B.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points.

Some embodiments described herein may include automated machine learning to determine risk levels, identify relevant risk factors, evaluate home telematics data and/or user telematics data, identify environmental risk factors, identify locale-based risk factors, identify heating system risk factors, identify plumbing risk factors, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element may be trained using supervised or unsupervised machine learning, which may be followed by or used in conjunction with reinforced or reinforcement learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as weather data, operation data, customer financial transaction, location, browsing or online activity, mobile device, vehicle, and/or home sensor data) in order to facilitate making predictions for subsequent customer data. Models may be created based upon example inputs of data in order to make valid and reliable predictions for novel inputs.

Additionally or alternatively, the machine learning programs may be trained by inputting sample data sets or certain data into the programs, such as mobile device, server, or home system sensor and/or control signal data, and other data discussed herein. The machine learning programs may utilize deep learning algorithms that are primarily focused on pattern recognition and may be trained after processing multiple examples. The machine learning programs may include Bayesian program learning (BPL), voice recognition and synthesis, image or object recognition, optical character recognition, and/or natural language processing, either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated. These techniques may be followed by reinforced or reinforcement learning techniques.

The machine learning programs may be trained with smart device-mounted, home-mounted, and/or mobile device-mounted sensor data to identify certain internal entity data, such as analyzing home telematics data and/or user telematics data to identify and/or determine environmental data, location data, first responder data, home structure data, occupancy data, water data, electricity data, water usage data, electricity usage data, usage data, a likelihood of pipe damage, and/or other such potentially relevant data. In some embodiments, the machine learning programs may be trained with irregularities such that the machine learning programs may be trained to match, compare, and/or otherwise identify impact factors based upon internal entity data. Depending on the embodiment, the machine learning programs may be initially trained according to such using example training data and/or may be trained while in operation using particular internal entity data.

After training, machine learning programs (or information generated by such machine learning programs) may be used to evaluate additional data. Such data may be related to publicly accessible data, such as building permits and/or chain of title. Other data may be related to privately-held data, such as insurance and/or claims information related to the property and/or items associated with the property. The trained machine learning programs (or programs utilizing models, parameters, or other data produced through the training process) may then be used for determining, assessing, analyzing, predicting, estimating, evaluating, or otherwise processing new data not included in the training data. Such trained machine learning programs may, therefore, be used to perform part or all of the analytical functions of the methods described elsewhere herein.

It will be understood that the above disclosure is one example and does not necessarily describe every possible embodiment. As such, it will be further understood that alternate embodiments may include fewer, alternate, and/or additional steps or elements.

Figure 2A:
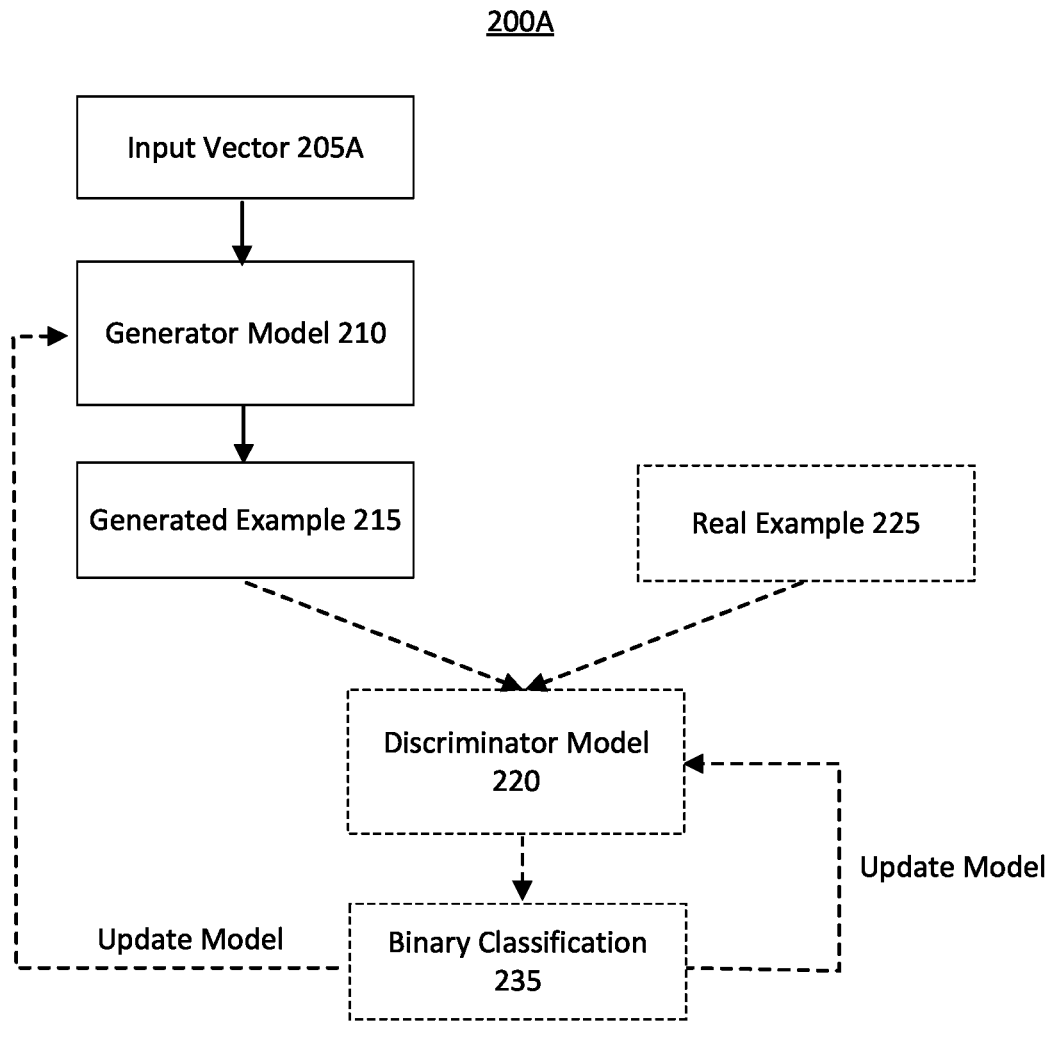
FIG. 2A depicts an exemplary artificial intelligence and/or machine learning model to be implemented in a generative device as described with regard to FIG. 1.

Exemplary Systems for Detecting and Responding to Heating System Malfunctions FIG. 2A illustrates an exemplary model 200A using generative AI and/or ML techniques. In particular, a generator model 210 and a discriminator model 220 receive inputs to generate a binary classification 235 and output text used to analyze internal entity data.

In particular, the generator model 210 receives an input vector 205A to generate a generated example 215. In some embodiments, the input vector 205A may be a fixed-length random vector. In further embodiments, the input vector 205A may be drawn randomly from a Gaussian distribution such that points in the vector space corresponding to the input vector 205A may correspond to points in the problem domain representative of the data distribution. Depending on the embodiment, the vector space corresponding to the input vector 205A may include one or more hidden variables (e.g., variables that are not directly observable). In some embodiments, the input vector 205A may be used to seed the generative process. Using the input vector 205A, the generator model 210 then generates a generated example 215.

In some embodiments, the discriminator model 220 may then receive the generated example 215 and/or a real example 225. The discriminator model 220 may generate a binary classification 235 denoting whether the received input is generated (e.g., the generated example 215) or real (e.g., the real example 225). The exemplary model 200A may additionally output an output product (e.g., dialogue, textual output, visual output, etc.) and/or use the binary classification 235 in training the generator model 210 and/or discriminator model 220.

In further embodiments, the generator model 210 and the discriminator model 220 may receive additional inputs and/or information, such as a class value, a class label, modality data, etc. In some such embodiments, the additional information may function similarly to supervised machine learning techniques, and embodiments without the additional information may function similarly to unsupervised machine learning techniques.

In still further embodiments, the exemplary model 200A may use both the generator model 210 and the discriminator model 220 for training and may subsequently use only the generator model 210 for generative modeling as described herein.

In some embodiments, the generator model 210 and the discriminator model 220 are trained according to adversarial techniques (e.g., when the discriminator model 220 correctly generates the binary classification 235, the generator model 210 is updated and, when the discriminator model 220 incorrectly generates the binary classification 235, the discriminator model 220 is updated).

Depending on the embodiment, the generator model 210 and/or the discriminator model 220 may be or include neural networks, such as artificial neural networks (ANN), convolution neural networks (CNN), or recurrent neural networks (RNN). In further embodiments, the model 200A, the generator model 210, and/or the discriminator model 220 may incorporate, include, be, and/or otherwise use language model techniques (e.g., a large language model (LLM), natural language processing (NLP), etc.). Similarly, the model 200A, the generator model 210, and/or the discriminator model 220 may incorporate, include, be, and/or otherwise use a transformer architecture to utilize the appropriate language model techniques, as described with regard to FIG. 2B below.

Figure 2B:
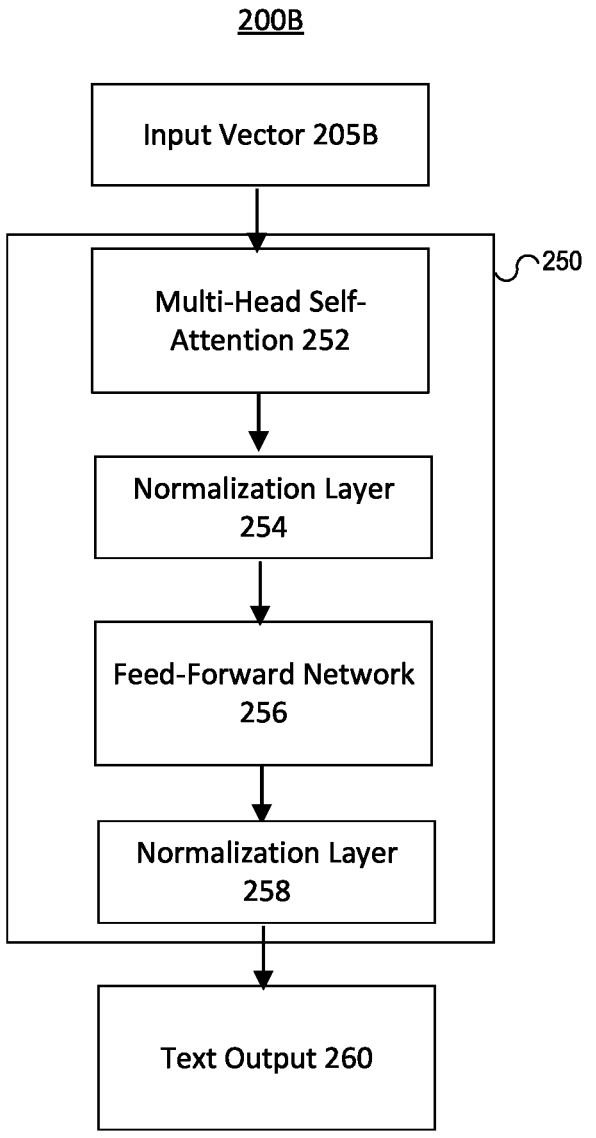
FIG. 2B depicts an exemplary large language model to be implemented in a generative device as described with regard to FIG. 1.

FIG. 2B illustrates an exemplary large language model 200B for training a generative model as described herein. In particular, a large language training module 250 receives an input vector 205B similar to input vector 205A and outputs a text output 260.

In particular, in some embodiments, the generative AI and/or ML model may be based upon an LLM trained to predict a word in a sequence of words. For example, the LLM may be trained to predict a next word following a given sequence of words (e.g., "next-token-prediction"), and/or trained to predict a "masked" (e.g., hidden) word within a sequence of given sequence of words (e.g., "masked-language-modeling"). For instance, in an example of next-token-prediction, the generative AI and/or ML model may be given the sequence "Jane is a"—and the generative AI and/or ML model may predict a next word, such as "dentist," "teacher," "mother," etc. In one example of masked-language-modeling, the generative AI and/or ML model may receive the given the sequence "Jane XYZ skiing"—and the generative AI and/or ML model may fill in XYZ with "loves," "fears," "enjoys," etc.

In some embodiments, this prediction technique is accomplished through a long-short-term-memory (LSTM) model, which may fill in the blank with the most statistically probable word based upon surrounding context. However, the LSTM model has the following two drawbacks. First, the LSTM model does not rate/value individual surrounding words more than others. For instance, in the masked-language-modeling example of the preceding paragraph, skiing may most often be associated with "enjoys;" however Jane in particular may fear skiing but the LSTM model is not able to correctly determine this. Second, instead of being processed as a whole, the words of the input sequence are processed individually and sequentially, thus restricting the complexity of the relationships that may be inferred between words and their meanings.

Advantageously, some embodiments overcome these drawbacks of the LSTM model by using transformers (e.g., by using a generative pre-trained transformer (GPT) model). More specifically, some embodiments use a GPT model that includes (i) an encoder that processes the input sequence, and (ii) a decoder that generates the output sequence. The encoder and decoder may both include a multi-head self-attention mechanism that allows the GPT model to differentially weight parts of the input sequence to infer meaning and context. In addition, the encoder may leverage masked-language-modeling to understand relationships between words and produce improved responses.

In particular, the input vector 205B may be a vector representative of relationships between words, phrases, etc. in the input. The large language training module 250 may include a self-attention block 252 component to attend to different parts of the input simultaneously or near-simultaneously to capture relationships and/or dependencies between the different parts of the input (e.g., referred to as a multi self-attention block, multi-head attention block, multi-head self-attention block, masked multi self-attention block, masked multi-head attention block, masked multi-head self-attention block, etc.). In particular, the self-attention block 252 relates different positions of a sequence to compute a representation of the sequence. As such, the self-attention block 252 may weigh an impact of different words in a sentence when sequencing. As such, the model 200B learns to give emphasis to different portions of an input vector 205B. Depending on the implementation, the self-attention block 252 may transform the input vector 205B into different sets (e.g., queries, keys, values, etc.). In some implementations, the self-attention block 252 may receive the input vector 205B already-transformed. The self-attention block 252 may then compute an attention score representing the impact of each word in the sentence with respect to the other words in the sentence (e.g., by taking a dot product between different vector sets). The output then proceeds to the normalization layer 254.

The normalization layer 254 may normalize the output of the self-attention block 252 (e.g., by applying a softmax function to normalize the scores).

Similarly, the self-attention block may subsequently output into a feed-forward network block 256, which performs a non-linear transformation to generate a new representation of the input and/or relationships between words, phrases, etc. In particular, the feed-forward network block 256 may compute a weighted sum of the vectors, using the calculated and normalized attention scores to capture the contextual relationships between words. In some implementations, the normalization layer 254 and/or the self-attention block 252 may perform the computation to generate a representation of the relationship between words, etc. After the feed-forward network block 256, an additional normalization layer 258 may normalize the respective output and/or add residual connection(s) to allow the output to move directly to another input. The model 200B may therefore learn which parts of an input are important (e.g., remain prevalent through the normalization process). Depending on the embodiment, the model 200B may repeat the process for the large language training module 250 1 time, 5 times, 10 times, N times, etc. to train the respective model(s).

Depending on the implementation, an encoder and/or a decoder may be trained as described above. In further implementations, the encoder is trained in accordance with the above, and a decoder includes an additional self-attention block (not shown) receiving the output of the encoder as well.

Furthermore, in some embodiments, rather than performing the previous four steps only once, the GPT model iterates the steps and performs them in parallel; at each iteration, new linear projection of the query, key, and value vectors are generated. Such iterative, parallel embodiments advantageously improve grasping of sub-meanings and more complex relationships within the input sequence data.

Further advantageously, some embodiments first train a basic model (e.g., a basic GPT model, etc.), and subsequently perform any of the following three steps on the basic model: supervised fine tuning (SFT); reward modeling; and/or reinforcement learning.

In the SFT step, a supervised training dataset is created. The supervised training dataset has known outputs for each input so that the model can learn from the correspondences between input and outputs. For example, to train the model to generate summary documents, the supervised training dataset may have: (a) inputs of (i) insurance company application (app) information, (ii) anonymized insurance claim information, (iii) police report information, and/or (iv) auxiliary information; and (b) outputs of summary documents.

In another example, to train the model to generate comparison documents, the supervised training dataset may have: (a) inputs of (i) summary documents, (ii) insurance company application (app) information, (iii) anonymized insurance claim information, (iv) police report information, and/or (v) auxiliary information; and (b) outputs of comparison documents.

In yet another example, to train the model to generate requests for information, the supervised training dataset may have: (a) inputs of indications of missing information (e.g., an administrator contacts the chatbot with the question "please draft an email requesting a police report corresponding to insurance claim XYZ"), and (b) outputs of requests for information (e.g., in the form of a draft email or other message to send to an administrator of the police reports database, or an email or other message that the chatbot sends directly to the administrator of the police reports database, etc.).

Training the basic model on the supervised training dataset may create the SFT model; and subsequent to creating the SFT model, the generative AI and/or ML model may be trained according to reward modeling. In reward modeling, the SFT may be fed input prompts, and may output multiple outputs (e.g., 2-10 outputs, etc.) for each input. The multiple outputs for each input may be achieved by, for example, randomness, or by controlling a predictability setting. A user may then rank the multiple outputs for each input, thus allowing the model to associate each output with a reward (e.g., a scalar value). And the ranked outputs may then be used to further train the SFT model. Similarly, the reward modeling may be performed as otherwise described herein.

Subsequently, the generative AI and/or ML model may further be trained via reinforcement learning. Here, further inputs are fed into the model, and the model then generates, based upon the policy learned during reward modeling, (i) outputs corresponding to the inputs, and (ii) rewards values (e.g., scalar values) corresponding to the input/output pairs. The rewards values may then be fed back into the model to further evolve the policy.

In some embodiments, the reward modeling and reinforcement learning steps may be iterated any number of times.

It will be understood that the above disclosure is one example and does not necessarily describe every possible embodiment. As such, it will be further understood that alternate embodiments may include fewer, alternate, and/or additional steps or elements.

Exemplary Generative AI/ML Model Exchange Applications and Interfaces

Figure 3:
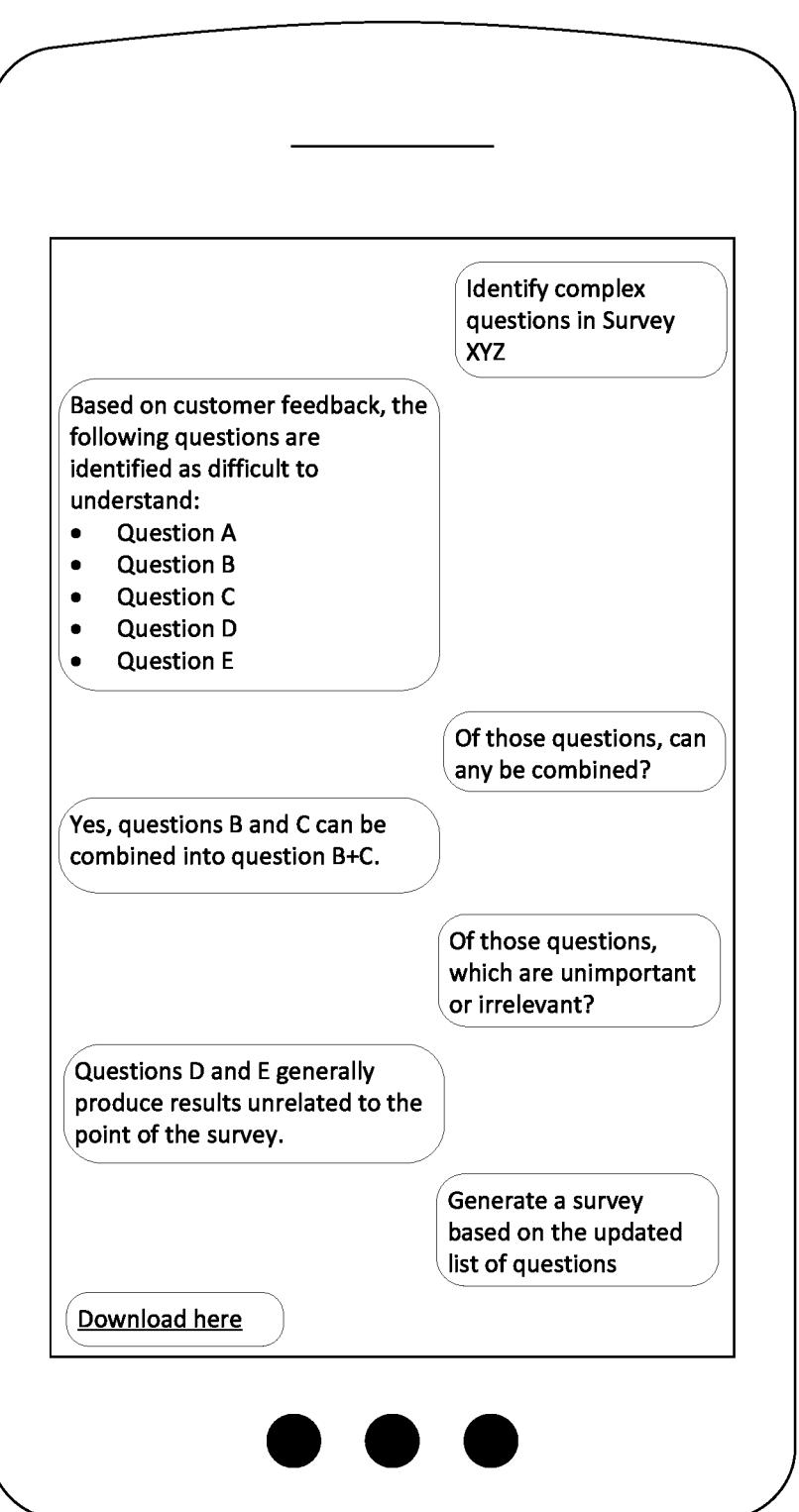
FIG. 3 depicts an exemplary interface with which a user interacts with an intelligence and/or machine learning model in a generative device as described with regard to FIG. 1.
Figure 4A:
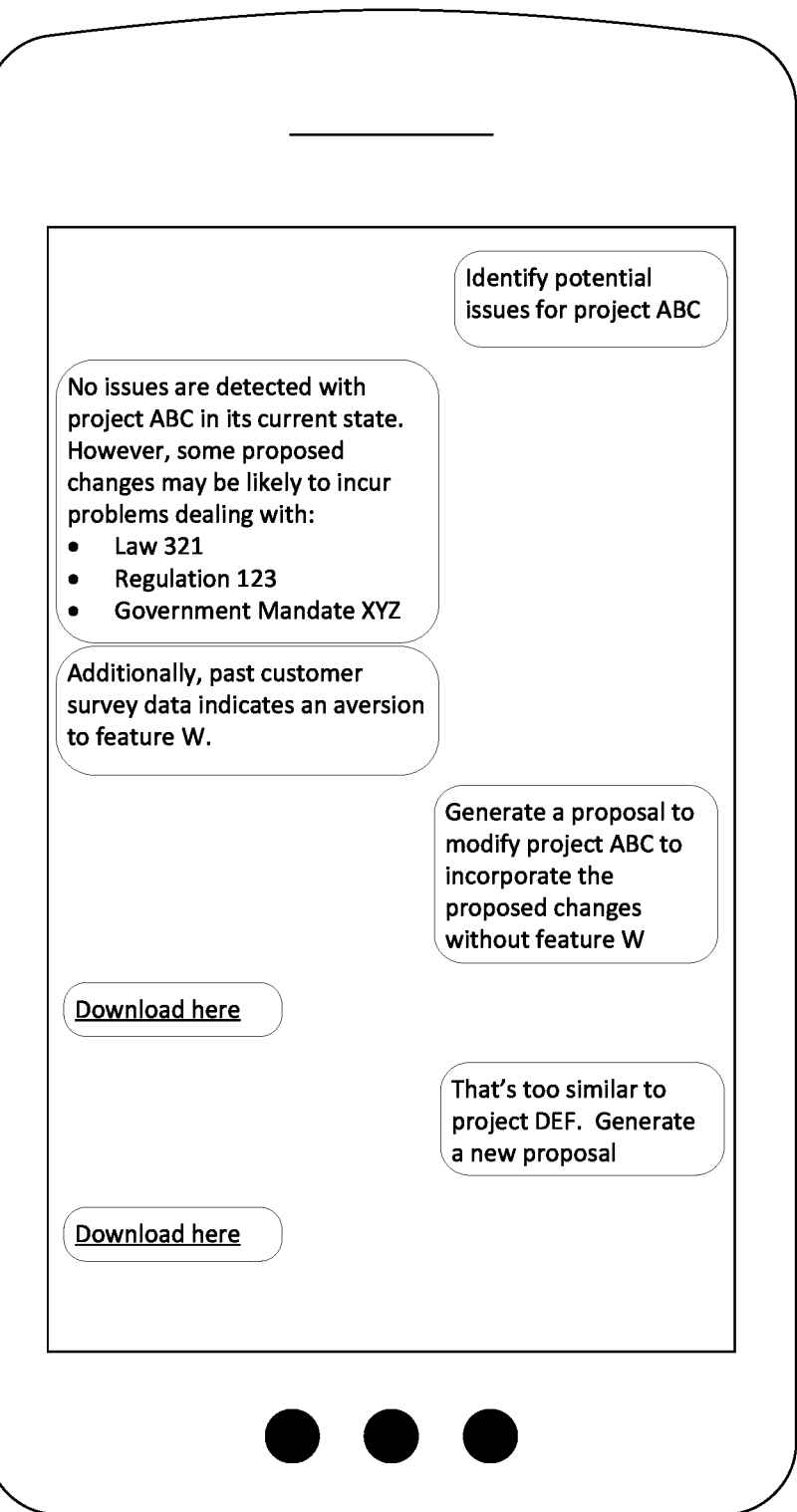
FIG. 4A depicts another exemplary interface with which a user interacts with an intelligence and/or machine learning model in a generative device as described with regard to FIG. 1.
Figure 4B:
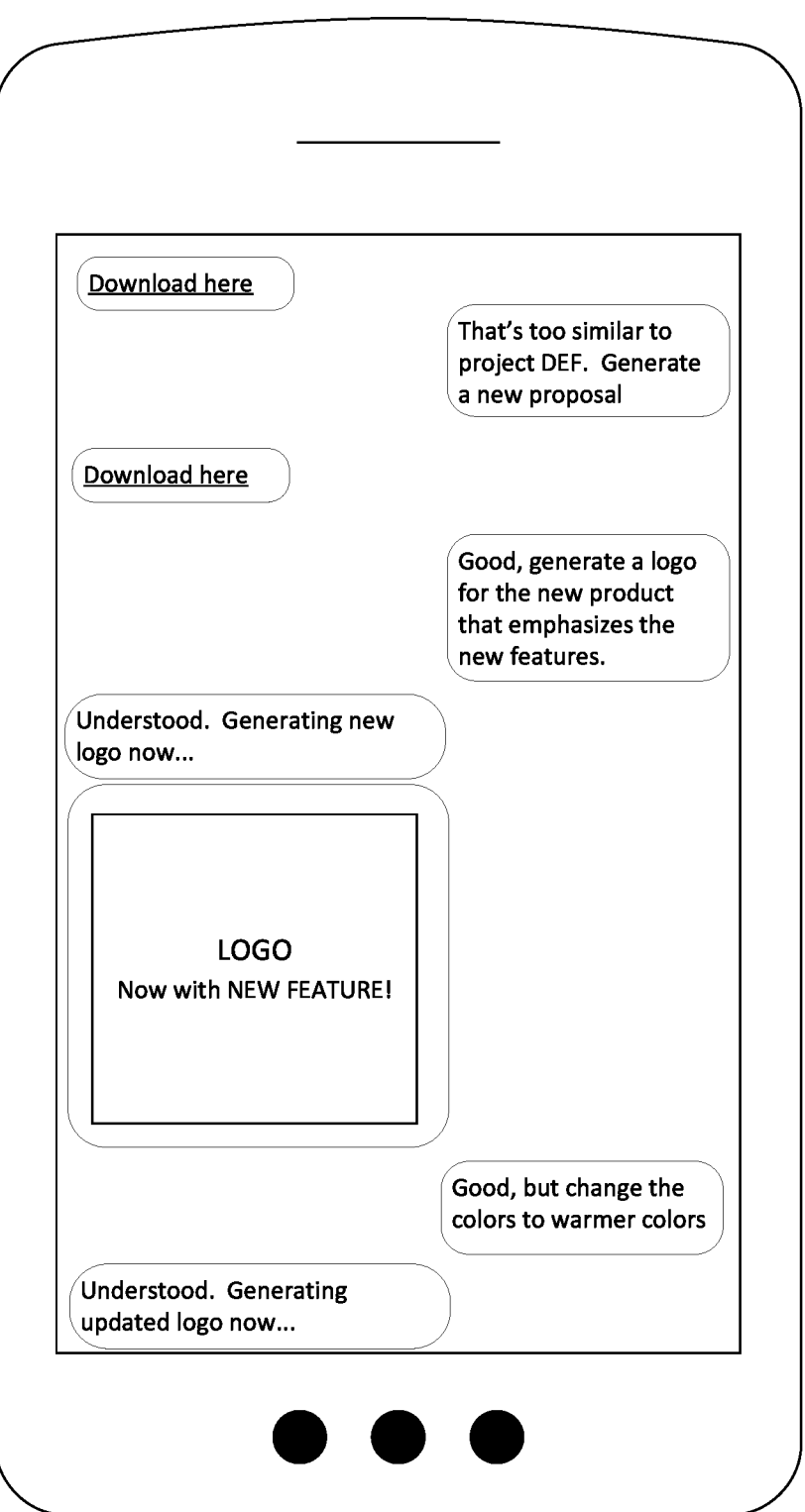
FIG. 4B depicts an extension of the exemplary interface as described with regard to FIG. 4A including a generated visual output associated with the dialogue.

FIGS. 3-4B illustrate exemplary interfaces for communicating with a generative AI and/or ML model. In particular, FIG. 3 illustrates an interface 300 that displays an exchange between a user and the generative AI and/or ML model. In particular, a user requests that the generative AI and/or ML model identify questions in a particular survey saved in an internal database (e.g., internal database 116) that can be removed and/or otherwise reduced to improve understandability and/or likelihood for a user to complete the entire survey. Although FIG. 3 depicts such a process with regard to a survey, it will be understood that an interface 300 may respond to similar queries and/or requests as otherwise detailed herein.

In some embodiments, the user starts the interaction by issuing a command to the generative AI and/or ML model. For example, in the exemplary interface 300, the user commands the generative AI and/or ML model to identify complex questions in a survey. Depending on the embodiment, the user may command the generative AI and/or ML model to perform a similar simplification task according to the techniques described herein. For example, the user may command the generative AI and/or ML model to simplify questions asked in a phone exchange, steps in instructions provided to an employee, steps in a training module, etc.

In further embodiments, the generative AI and/or ML model additionally or alternatively determines that a survey (or other exchange as described herein) may be complex and/or difficult to understand, and may prompt the user to simplify the survey. In still further embodiments, the user may provide a general prompt to the generative AI and/or ML model to identify one or more exchanges to simplify and the generative AI and/or ML model may identify a particular survey and provide proposed changes in response.

The generative AI and/or ML model may then prepare a list of questions identified as difficult to understand and/or complex. In some embodiments, the generative AI and/or ML model may generate the list based upon information stored in an internal database, such as historical customer feedback, internal analysis, real-time feedback, etc.

The user may then provide further modifications and/or refinements to the generative AI and/or ML model. In the exemplary interface 300, the user further commands the generative AI and/or ML model to combine relevant questions, determine which questions are unimportant (e.g., questions that tend to provide irrelevant answers, provide contradictory answers, provide difficult to understand and/or analyze answers, confuse the individual answering, etc.). It will be understood that the commands displayed in the exemplary interface 300 are exemplary only, and further commands, requests, etc. may be provided by a user.

The user may then request the generative AI and/or ML model to generate a new product (a survey in the example of FIG. 3) based upon the modifications in question. The generative AI and/or ML model may provide the product directly or may provide a link for the user to access and/or download the generated product.

It will further be understood that the above disclosure is one example and does not necessarily describe every possible embodiment. As such, it will be further understood that alternate embodiments may include fewer, alternate, and/or additional steps or elements.

FIGS. 4A and 4B illustrate interfaces 400A and 400B that display an analysis for a potential project, potential problems for the project, and ultimately generate a new proposal and logo for the project in question. Depending on the embodiment, the exemplary interfaces 400A and 400B may resemble the exemplary interface 300 of FIG. 3, and relevant embodiments may similarly apply to FIGS. 4A and 4B.

In some embodiments, the generative AI and/or ML model may access additional databases besides an internal database (e.g., internal database 116) to carry out a command or request from the user. For example, the generative AI and/or ML model may access public governmental databases to determine what may affect implementation of a project. For example, in the exemplary interface 400A, the generative AI and/or ML model detects various laws, regulations, and/or mandates that may hinder/affect a project, changes to a project, or public opinion of a project. Similarly, the generative AI and/or ML model may determine that past attempts at incorporating a feature have similarly caused problems and recommend a course of action to avoid or mitigate such concerns.

Further, the generative AI and/or ML model may modify or generate a new version of a proposal in response to a command by the user. For example, if the user responds that a project proposal is too similar to another, existing project, the generative AI and/or ML model may access the other project, identify key characteristics, and modify the new proposal to avoid aspects of the previous project. Depending on the embodiment, the generative AI and/or ML model may make such a determination according to large language model training techniques or other such techniques as described herein.

The generative AI and/or ML model may similarly identify key points (e.g., according to the user input, according to past key points, according to customer feedback, etc.) and may generate a logo or other image-based proposal according to a project proposal. The user may similarly request changes to the image-based proposal as a text-based proposal.

It will further be understood that the above disclosure is one example and does not necessarily describe every possible embodiment. As such, it will be further understood that alternate embodiments may include fewer, alternate, and/or additional steps or elements.

Exemplary Computer-Implemented Method for
Using a Generative Model to Analyze Internal
Database Information FIG. 5 is a flow diagram of an exemplary computer-implemented method 500 for analyzing internal entity data. The method 500 may be implemented by one or more processors of a computing system such as a computing device representing internal database 116 or mobile device 112. Alternatively or additionally, the method 500 may be implemented by one or more processors of a distributed system such as system 100 and/or various components of system 100 as described with regard to FIGS. 1 and/or 2 above, or otherwise implemented by one or more local or remote processors, servers, sensors, transceivers, memory units, wearables, smart contacts, smart glasses, virtual reality headsets, augmented reality glasses or headsets, mixed or extended reality headsets or glasses, voice or chat bots, generative AI, and/or other electronic or electrical components, including those mentioned elsewhere herein.

At block 502, the generative AI or ML model may receive internal database information at a generative AI model. In some embodiments, the internal database information may include data associated with interaction dialogue. For example, the internal database information may include any or all of customer feedback information, market feedback information, project information, internal inventory information, etc. In further embodiments, the internal database information may include data gathered from one or more customers, users, properties, vehicles, company projects, employees, etc. and stored in an internal database. Similarly, the internal database information may include personnel information and/or information logged by employees, managers, etc. (e.g., employee reviews, self-reviews, etc.).

In still further embodiments, the internal database information may include or be supplemented by information directly input by a user into the generative AI or ML model. For example, an internal webpage, application, etc. may include a search bar, into which a user may input information, search terms, commands, etc. for the generative AI or ML model to use.

At block 504, the generative AI or ML model may analyze the internal database information via the generative AI model to generate an internal database analysis. In some embodiments, the generative AI or ML model may generate the analysis by extracting one or more relevant portions of the internal database information. For example, when the internal database information includes market feedback information, the generative AI model may determine one or more concepts in the market feedback information (e.g., projects, individual items, PR campaigns, etc.).

Depending on the embodiment, the analysis may include generation of a work product or other item to present to a user. For example, the generative AI or ML model may generate reports according to business results (e.g., quarterly or yearly results). As another example, the generative AI or ML model may evaluate employee performance and generate one or more of a rank, suggested raise, list of promotions, special bonuses, etc. Similarly, the generative AI or ML model may analyze internal data (documents, emails, etc.) to rank sources of cost, labor, etc. in a project and determine how to modify the overall projects to increase efficiency, create simple tasks, etc. For example, the generative AI or ML model may determine projects or characteristics of a particular department, such as likely pain points, potential missed deadlines, recommendations for a department, a list of prioritized items (e.g., pending, future, or a backlog) to be addressed, relation between applications or data (e.g., what applications or data a department develops interact and/or interact with applications or data another department develops), etc. Moreover, the generative AI or ML model may analyze notes, documents, etc. and generate an estimation for how much time was spent on a project, meeting, etc.

In further embodiments, the analysis may include one or more actions taken by the generative AI or ML model with permission from the user. For example, the generative AI or ML model may prompt a user to allow access to internal emails and/or documents. The generative AI or ML model may then determine employees or markets that would be suitable for a new project due to expertise, familiarity, interest, or other characteristics that may not be immediately clear from an employee profile. Similarly, the generative AI or ML model may determine potential managers, investors, teams, departments, vendors, stakeholders, etc.

In still further embodiments, the generative AI or ML model may prompt the user to permit the generative AI or ML model to modify one or more documents. For example, the generative AI or ML model may determine a list of policies, rules, products, etc. that have not been revised or are in conflict with one another. The generative AI or ML model may flag the policies for review or may write updated language for at least some of the policies to bring the policies in line with company standards, third-party requirements (e.g., government regulations), user preferences, other policies, etc. Similarly, the generative AI or ML model may detect potential loopholes are present in policy language based upon evolving language standards. In some such embodiments, the generative AI or ML model accesses and uses external data in addition to the internal data.

Depending on the embodiment, the analysis may be an analysis of the internal database data with regard to a dialogue (e.g., analyzing the data to determine a preferred method or technique for presenting the data to a user) and/or with regard to the substance of the data (e.g., analyzing data used for a survey to generate a survey output). For example, the generative AI or ML model may receive individualized market feedback shared by consumers and/or industry leaders to generate a recommendation with regard to a product or service. The generative AI or ML model may further generate a dialogue recommendation determined to most effectively convey key features to a user or a consumer, as discussed in more detail below with regard to the impact factors.

At block 506, the generative AI or ML model may identify, based upon at least the internal database analysis, one or more impact elements regarding human understanding of the internal database information via the generative AI model. In some embodiments, the generative AI or ML model may identify the one or more impact elements by identifying one or more words or phrases associated with one or more concepts (e.g., as determined in block 504 and/or as part of block 506) and determining an impact of the one or more words or phrases on an understanding of the internal database information. Depending on the embodiment, the concepts may be concepts associated with one or more questions or a survey (e.g., for customer feedback information, market feedback information, etc.).

In some embodiments, the one or more impact elements may include one or more elements that cause or are predicted to cause confusion to users. For example, parts of the claims process that are determined to be confusing to a responder (e.g., via survey data) may be flagged, identified, or summarized, or otherwise prepared for review.

In further embodiments, the one or more impact elements may include one or more elements that are determined or predicted to cause sentiment change in users or customers. For example, the generative AI or ML model may determine that information will be received poorly by a customer (e.g., an insurance policy does not cover a particular item) and may, when generating a dialogue output (e.g., as described with regard to block 508 below) may determine additional information to help the customer or otherwise offset the bad news. Similarly, the generative AI or ML model may determine that impact elements may be met poorly and provide recommendations to a user to deemphasize or remove such elements while emphasizing or adding elements that may be well-received instead.

At block 508, the generative AI or ML model may generate, based upon at least the one or more impact elements, a dialogue output regarding the data via the generative AI model. In some embodiments, the dialogue output may include context for a user (e.g., to improve a user's understanding), simplified language, a reduced number of questions (e.g., for a survey), simplified questions for a user, determinations of what questions are useful for what demographic (e.g., retirement information may be more useful for an older demographic). For example, the dialogue output may recommend one or more suggestions for broadening an understandability of questions, information, language, etc. to a larger audience to ensure that any potential customers or users would understand the language in question.

Similarly, the dialogue output may be a recommendation to condense a number of questions being asked to users by combining similar questions or removing questions that do not provide important or useful feedback. In some such embodiments, the generative AI or ML model may request access to data sources for a user and may automatically answer one or more questions without user input. The generative AI or ML model may then determine which questions remain unanswered and may prompt a user to ask such to a customer and/or provide such to a customer. In still further such embodiments, the generative AI or ML model prepares a hierarchy (e.g., assigns importance and/or ranking to questions) for questions based upon user data (e.g., a user registered as legally blind may have questions related to driving deemphasized or removed) and provides such questions to the user based upon the determined hierarchy.

In still further embodiments, the dialogue output may include an agenda, lists of tasks, lists of personnel (e.g., to find people interested in and/or skilled in something), an expected sentiment for a proposed change or campaign, a prediction of how a message will be received, experience of individuals and/or teams, pain points for departments, deadlines missed, product or project recommendations, backlog of prioritized items, work to be prioritized, a determination of who stakeholders should be for a project, key features and/or functionalities of a project, expected cost of a project, a receipt for an ordered inventory, a simplified training program, a tailored goal for an employee, a comprehensive study of work by a team, retirement planning information, step-by-step instructions understandable to a user to explain a process, etc.

Depending on the embodiment, the dialogue output may include an impact determination regarding customer perspectives, regulatory issues, legal issues, government agency issues, public relation issues, good will impact, climate impact, etc. In further embodiments, the dialogue output may include a summarized version of standard calls between salespeople and customers as (i) an automation technique, (ii) a summary technique, (iii) a time saving technique (e.g., a customer asks a question and the generative AI model determines common answers based upon input standard call data), or any other such technique.

Similarly, the dialogue output may include summaries and/or scripts for a user with regard to presenting information, such as information generated as part of the analysis at block 504 above. For example, the dialogue output may include answers to commonly asked questions, an automated underwriting analysis, an automatic purchase order for one or more resources, a recommendation for reducing costs, one or more training plans, and/or any other similar technique as described herein.

Although the description herein generally refers to a "dialogue output", it will be understood that such a dialogue output may be inclusive of text outputs, voice outputs, visual outputs, gesture outputs, etc. For example, when generating a training plan (e.g., for a new employee), the generative AI or ML model may generate videos, scripts, images, music, etc. based upon an analysis and/or determination of effective training methods or techniques. And as noted elsewhere, the voice bot, chatbot, generative pretrained transformer bot (e.g., ChatGPT®-based bot and/or ChatGPT® bot), and/or other bots may generate audible or verbal output, text or textual output, visual or graphical output, output for use with speakers and/or display screens, and/or other types of output for user and/or other computer or bot consumption.

In some embodiments, the generative AI or ML model may additionally or alternatively generate a statistical model as a modification from another model. For example, the generative AI or ML model may use a flagship model and remove, add, or otherwise modify a parameter to generate a new model with an exception, addition, or modification based upon internal data. In further embodiments, the generative AI or ML model may determine parameters to remove, add, or modify based upon a dialogue with a user as generally described herein.

It will be understood that the above disclosure is one example and does not necessarily describe every possible embodiment. As such, it will be further understood that alternate embodiments may include fewer, alternate, and/or additional steps or elements.

With the foregoing, a user may opt-in to a rewards, insurance discount, or other type of program. After the user provides their affirmative consent, an insurance provider remote server may collect data from the user's mobile device, smart home device, smart vehicle, wearables, smart glasses, smart contacts, smart watch, augmented reality glasses, virtual reality headset, mixed or extended reality headset or glasses, voice or chat bots, generative pretrained transformer bot (e.g., ChatGPT® bots), and/or other smart devices—such as with the customer's permission or affirmative consent. The data collected may be related to smart home functionality, accident data, and/or insured assets before (and/or after) an insurance-related event, including those events discussed elsewhere herein. In return, risk averse insureds, home owners, or home or apartment occupants may receive discounts or insurance cost savings related to home, renters, auto, personal articles, and other types of insurance from the insurance provider.

In one aspect, smart or interconnected home data, user data, and/or other data, including the types of data discussed elsewhere herein, may be collected or received by an insurance provider remote server, such as via direct or indirect wireless communication or data transmission from a smart home device, mobile device, smart vehicle, wearable, smart glasses, smart contacts, smart watch, augmented reality glasses, virtual reality headset, mixed or extended reality glasses or headset, voice bot, chat bot, generative pretrained transformer bot (e.g., ChatGPT® bot), and/or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, vehicles, or renter belongings, and/or (ii) home or apartment renters and/or occupants.

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of "a" or "an" is employed to describe elements and components of the embodiments herein. This is done merely for convenience and to give a general sense of the invention. This description should be read to include one or at least one and the singular also may include the plural unless it is obvious that it is meant otherwise.

Upon reading this disclosure, those of skill in the art will appreciate still additional alternative structural and functional designs for providing feedback to owners of properties, through the principles disclosed herein. Therefore, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

What is claimed:

1. A computer-implemented method for identifying impactful elements in database information to generate a dialogue output, the computer-implemented method comprising:

receiving, by one or more processors, internal database information at a generative artificial intelligence (AI) model, wherein the internal database information includes data associated with interaction dialogue;

analyzing, by the one or more processors, the internal database information via the generative AI model to generate an internal database analysis;

identifying, by the one or more processors and based upon at least the internal database analysis, one or more impact elements regarding human understanding of a previous dialogue output from the interaction dialogue in the internal database information via the generative AI model, wherein the one or more impact elements are determined to negatively impact the human understanding of the previous dialogue output, wherein identifying the one or more impact elements includes:

determining, by the one or more processors and based upon at least the internal database analysis, one or more concepts central to one or more questions associated with the previous dialogue output, identifying, by the one or more processors, one or more words or phrases associated with the one or more concepts, and determining, by the one or more processors, an impact of the one or more words or phrases on the human understanding;

retraining, by the one or more processors, the generative AI model by:

modifying, based upon the human understanding of the internal database information, weights that are (i) associated with vectors representative of the one or more impact elements and (ii) used by the generative AI model to generate dialogue outputs; and generating, by the one or more processors and based upon at least the modified weights corresponding to the one or more impact elements, a dialogue output regarding the data via the generative AI model with one or more new impact elements predicted to positively impact a new human understanding of the dialogue output.

2. The computer-implemented method of claim 1, wherein the internal database information includes at least one of: (i) customer feedback information, (ii) market feedback information, (iii) project information, or (iv) internal inventory information.

3. The computer-implemented method of claim 2, wherein the internal database information includes the customer feedback information and generating the dialogue output includes:

determining, by the one or more processors, an impact of one or more alternative words or phrases on the human understanding of the internal database information, wherein the one or more alternative words or phrases are associated with the one or more concepts; and generating, by the one or more processors, one or more alternate questions for a survey associated with the customer feedback information based upon at least the one or more alternative words or phrases.

4. The computer-implemented method of claim 2, wherein the internal database information includes the market feedback information, the one or more concepts include one or more concepts of the market feedback information, and identifying the one or more impact elements includes:

identifying, by the one or more processors, one or more positive words or phrases associated with the market feedback information using the generative AI model.

5. The computer-implemented method of claim 4, the dialogue output includes at least one of: (i) a product pitch, (ii) a service pitch, or (iii) a public relations campaign associated with the data.

6. The computer-implemented method of claim 1, wherein the one or more impact elements include an impact of the data on at least one of: (i) public relations, (ii) good will associated with a project, (iii) regulatory ramifications, (iv) potential legal ramifications, or (v) governmental oversight of the project.

7. The computer-implemented method of claim 1, wherein the generative AI model includes at least one of: (i) an AI text chatbot or (ii) an AI voice chatbot.

8. A computer system for identifying impactful elements in database information to generate a dialogue output, the computer system comprising:

one or more processors;

a communication unit; and a non-transitory computer-readable medium coupled to the one or more processors and the communication unit and storing instructions thereon that, when executed by the one or more processors, cause the computer system to:

receive internal database information at a generative artificial intelligence (AI) model, wherein the internal database information includes data associated with interaction dialogue;

analyze the internal database information via the generative AI model to generate an internal database analysis;

identify, based upon at least the internal database analysis, one or more impact elements regarding human understanding of a previous dialogue output from the interaction dialogue in the internal database information via the generative AI model, wherein the one or more impact elements are determined to negatively impact the human understanding of the previous dialogue output, wherein identifying the one or more impact elements includes:

determining, by the one or more processors and based upon at least the internal database analysis, one or more concepts central to one or more questions associated with the previous dialogue output, identifying, by the one or more processors, one or more words or phrases associated with the one or more concepts, and determining, by the one or more processors, an impact of the one or more words or phrases on the human understanding;

retrain the generative AI model by:

modifying, based upon the human understanding of the internal database information, weights that are (i) associated with vectors representative of the one or more impact elements and (ii) used by the generative AI model to generate dialogue outputs; and generate, based upon at least the modified weights corresponding to the one or more impact elements, a dialogue output regarding the data via the generative AI model with one or more new impact elements predicted to positively impact a new human understanding of the dialogue output.

9. The computer system of claim 8, wherein the internal database information includes at least one of: (i) customer feedback information, (ii) market feedback information, (iii) project information, or (iv) internal inventory information.

10. The computer system of claim 9, wherein the internal database information includes the customer feedback information and generating the dialogue output includes:

determining an impact of one or more alternative words or phrases on the human understanding of the internal database information, wherein the one or more alternative words or phrases are associated with the one or more concepts; and generating one or more alternate questions for a survey associated with the customer feedback information based upon at least the one or more alternative words or phrases.

11. The computer system of claim 9, wherein the internal database information includes the market feedback information, the one or more concepts include one or more concepts of the market feedback information, and identifying the one or more impact elements includes:

identifying one or more positive words or phrases associated with the market feedback information using the generative AI model.

12. The computer system of claim 11, the dialogue output includes at least one of: (i) a product pitch, (ii) a service pitch, or (iii) a public relations campaign associated with the data.

13. The computer system of claim 8, wherein the one or more impact elements include an impact of the data on at least one of: (i) public relations, (ii) good will associated with a project, (iii) regulatory ramifications, (iv) potential legal ramifications, or (v) governmental oversight of the project.

14. The computer system of claim 8, wherein the generative AI model includes at least one of: (i) an AI text chatbot or (ii) an AI voice chat bot.

15. A tangible, non-transitory computer-readable medium storing instructions for identifying impactful elements in database information to generate a dialogue output that, when executed by one or more processors of a computing device, cause the computing device to:

receive internal database information at a generative artificial intelligence (AI) model, wherein the internal database information includes data associated with interaction dialogue;

analyze the internal database information via the generative AI model to generate an internal database analysis;

identify, based upon at least the internal database analysis, one or more impact elements regarding human understanding of a previous dialogue output from the interaction dialogue in the internal database information via the generative AI model, wherein the one or more impact elements are determined to negatively impact the human understanding of the previous dialogue output, wherein identifying the one or more impact elements includes:

determining, by the one or more processors and based upon at least the internal database analysis, one or more concepts central to one or more questions associated with the previous dialogue output, identifying, by the one or more processors, one or more words or phrases associated with the one or more concepts, and determining, by the one or more processors, an impact of the one or more words or phrases on the human understanding;

retrain the generative AI model by:

modifying, based upon the human understanding of the internal database information, weights that are (i) associated with vectors representative of the one or more impact elements and (ii) used by the generative AI model to generate dialogue outputs; and generate, based upon at least the modified weights corresponding to the one or more impact elements, a dialogue output regarding the data via the generative AI model with one or more new impact elements predicted to positively impact a new human understanding of the dialogue output.

16. The tangible, non-transitory computer-readable medium of claim 15, wherein the internal database information includes at least one of: (i) customer feedback information, (ii) market feedback information, (iii) project information, or (iv) internal inventory information.

17. The tangible, non-transitory computer-readable medium of claim 16, wherein the internal database information includes the customer feedback information and generating the dialogue output includes:

determining an impact of one or more alternative words or phrases on the human understanding of the internal database information, wherein the one or more alternative words or phrases are associated with the one or more concepts; and generating one or more alternate questions for a survey associated with the customer feedback information based upon at least the one or more alternative words or phrases.

* * * * *